H. W. ROGERS.
MECHANISM FOR CONTROLLING MOTION PICTURE AND SOUND REPRODUCING MECHANISMS.
APPLICATION FILED OCT. 11, 1913.
1,255,822.
Patented Feb. 5, 1918.
2 SHEETS—SHEET 1.
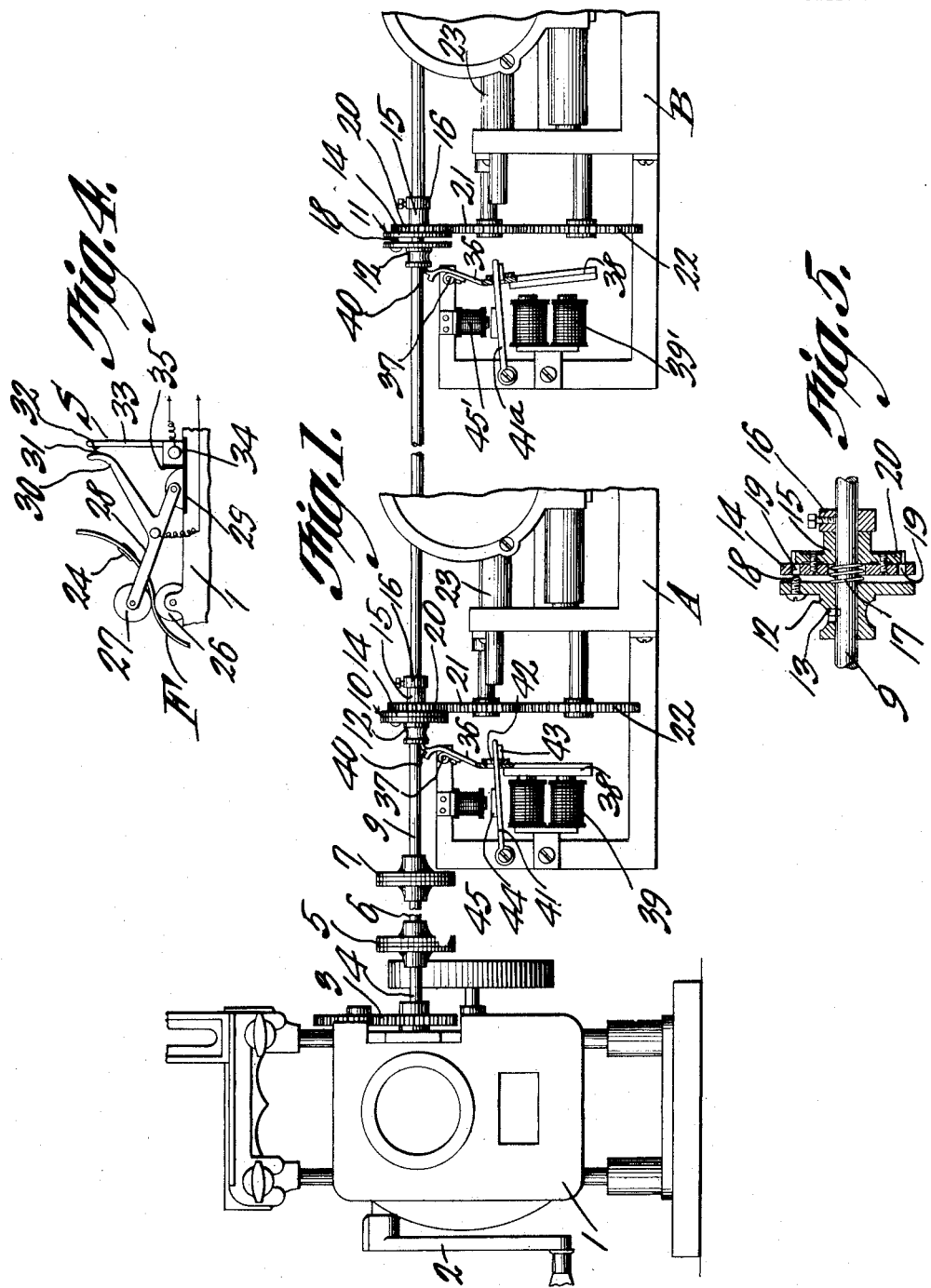
Witnesses
Harrison W. Rogers, Inventor
by C. A. Snow & Co.
Attorneys H. W. ROGERS.
MECHANISM FOR CONTROLLING MOTION PICTURE AND SOUND REPRODUCING MECHANISMS.
APPLICATION FILED OCT. 11, 1913.
1,255,822.
Patented Feb. 5, 1918.
2 SHEETS—SHEET 2.
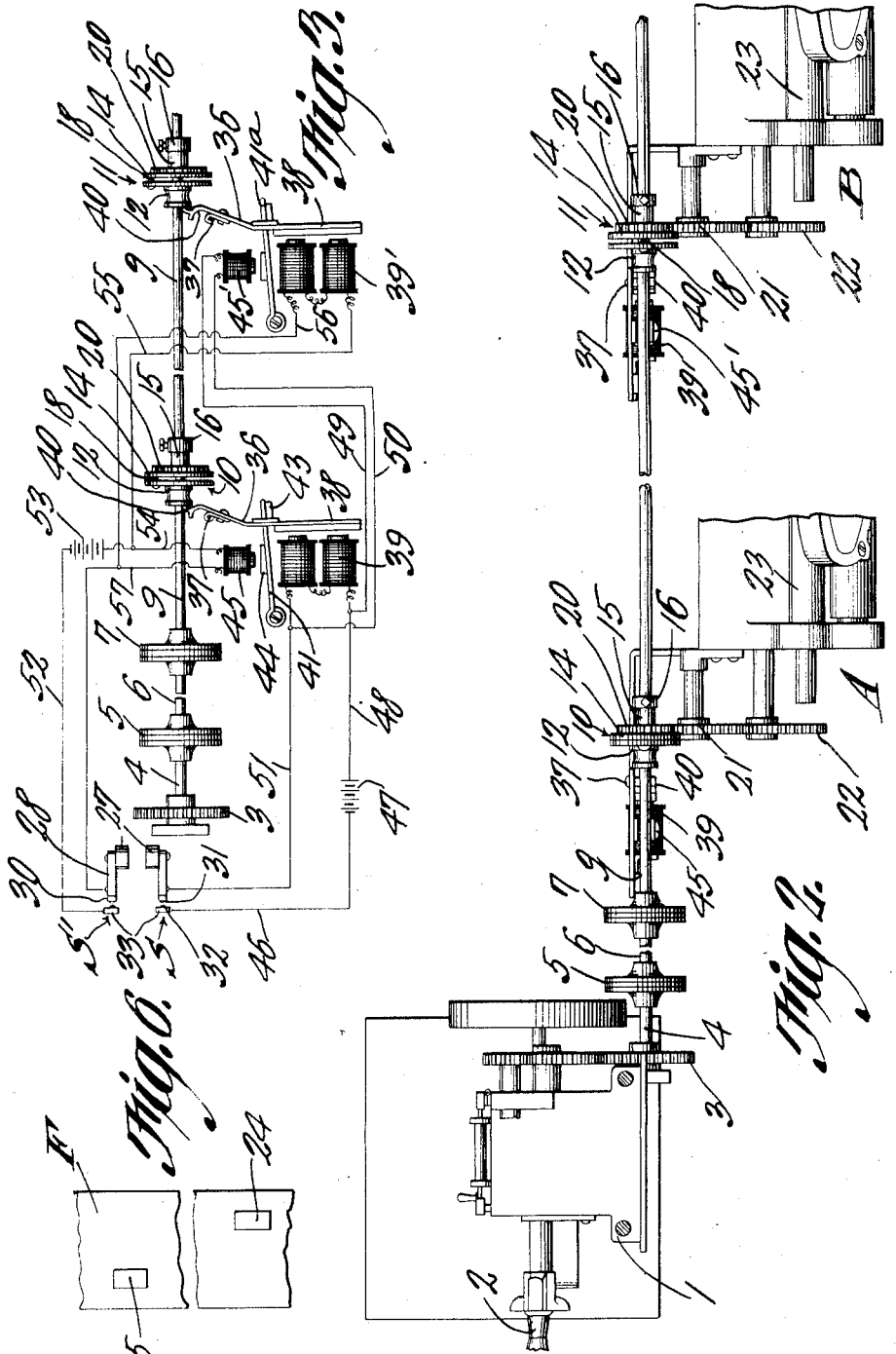
Witnesses
Harrison W. Rogers, Inventor
by C. A. Snow & Co.
Attorneys

UNITED STATES PATENT OFFICE.

HARRISON W. ROGERS, OF WHEELING, WEST VIRGINIA.

MECHANISM FOR CONTROLLING MOTION-PICTURE AND SOUND-REPRODUCING MECHANISMS.

1,255,822.   Specification of Letters Patent.   Patented Feb. 5, 1918.

Application filed October 11, 1913. Serial No. 794,632.

*To all whom it may concern:*

Be it known that I, HARRISON W. ROGERS, a citizen of the United States, residing at Wheeling, in the county of Ohio and State of West Virginia, have invented a new and useful Mechanism for Controlling Motion-Picture and Sound-Reproducing Mechanisms, of which the following is a specification.

The present invention relates to improvements in a mechanism for controlling motion picture and sound reproducing mechanisms, whereby the projector mechanism is connected to the sound record carrier or carriers, through the instrumentality of the moving film, the present application being a continuation of my co-pending application filed February 7, 1913, Serial No. 746,890, one object of the present invention being the provision of means, whereby a plurality of sound record carriers may be operated successively, the first record being started and stopped so that there is an alternate stopping and starting throughout the series of sound record carriers and thus permitting of the introduction of titles for the succeeding song, instrumental selection, or act.

Up to the present time, it has been impracticable to exhibit by the moving films, while the sound record was being operated, titles and announcements, for the reason that no provision has been made for halting the sound record carrier during the presentation of the title, or announcement, by the film, and further as a full film is usually of sufficient length to necessitate the employment or use of two or more sound records, and therefore permits the projection of means for illustrating in songs, several songs, it is desirable that such song or songs be announced by title. The present device is capable of performing these functions, there being provided means controlled by the film for connecting clutch members so that the sound record is rotated at the desired instant and after the presentation of a title upon the screen, through the film, such sound record being disconnected and halted, while the next succeeding title for the following sound record is presented, the second record and etc., being operably connected and disconnected from the projector similar to the first one. It is therefore one intention of the present invention, to provide a means, whereby the film at the proper time actuates a means to operate and permit the locking of the clutch members in engaged position, there being an automatic lock for locking the clutch members in such position, and at the proper time to release the locking device to free the clutch members so that the sound record is brought to a stoppage, even though the film continued its movement to present the title and the next succeeding scene.

In putting the present invention into practice, it is desirable that the clutch mechanism and the releasing mechanism be electromagnetically controlled, and that each be individually operated through coöperating means carried by and disposed in the path of the film.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—

Figure 1 is a front elevation of the projector mechanism of a motion picture machine, showing a means whereby two cylinder sound reproducing means are operably connected thereto, portions of said latter means being eliminated.

Fig. 2 is a top plan view of the parts illustrated in Fig. 1.

Fig. 3 is a diagrammatic view showing the electromagnets and the circuits by means of which the same are controlled to alternately start and stop successive sound record carriers.

Fig. 4 is an enlarged detail view of the film actuated switch for controlling the respective circuits.

Fig. 5 is an enlarged detail sectional view of one of the clutches used with the present invention.

Fig. 6 is a plan view of a portion of a film having two switch closure projections or buttons.

Referring to the drawings, the numeral 1 designates the main frame and mechanism carrying portion of the projector of a motion picture machine, having in the present instance the manually operated handle 2, which in motor machines is displaced by the usual electric or other motor. The gearing 3 of the projector mechanism, is of any construction, the present projector being indicative of any form of projector now upon the market and to which the present invention is applicable. The shaft 4 is operably connected to the gearing 3 and through the coupling 5 is connected to the short shaft 6, a coupling 7 connecting such short shaft 6 to the main record carrier driving shaft 9. Thus it will be seen that the shaft 9 is continuously rotated during the operation of the projector mechanism.

In the present illustration, two sound record carrying means A and B are illustrated, both of these, as will presently appear, being adapted to be connected, one at a time, to be operated from the shaft 9. Mounted upon the shaft 9 adjacent each one of the record carriers, is a clutch and transmission device 10 and 11 respectively, and as both are constructed identically, the description of one will suffice for both.

This clutch is particularly shown in detail in Fig. 5, and includes the slidable clutch member 12, keyed as at 13 to the shaft 9 so as to rotate with the shaft, the coöperating clutch member 14 thereof being mounted upon the shaft 9 through the instrumentality of the freely rotatable sleeve 15 and the limiting collar 16. The spring 17 normally holds the clutch member 12 separated from the member 14 so that the projecting screw 18 of the member 12 is held out of engagement with one of the apertures 19 of the member 14. By this means, it will be seen that when the member 12 is moved toward the member 14, the pin 18 is introduced into one of the apertures 19 and consequently the clutch member 14 rotates with the member 12.

In order that the respective clutches 10 and 11 may properly operate the respective sound record carrying means A and B, each freely rotatable member 14 is provided with the gear 20, which as shown meshes with the gear 21 of its respective record carrier and thus through the gear 22, operates the mandrel 23 upon which is adapted to be connected a cylinder sound record (not shown).

Under normal conditions, as before stated, the respective clutch members are in the position as shown in Fig. 5, the spring 17 holding the member 12 out of engagement with the member 14, and therefore in order to operate the member 12 of the respective clutches 10 and 11 alternately, so as to connect, as for instance, the sound record carrying means A for synchronous operation with the film F and during the operation of the projector, it is preferable that an electrical means be provided and control it through the instrumentality of the film and the switch device, as clearly shown in Fig. 4, and diagrammatically as shown in Fig. 3. As clearly shown in Fig. 3, two of these switch devices S and S' are employed, both of them being identical in construction, but being controlled by means of the buttons or projections 24 and 25, as clearly shown in Fig. 6, said projections or buttons being placed upon the film F at predetermined points, that is the point at which it is desirable to operate the respective switches S and S' to thus throw the clutch 10 and release the clutch 11, or vice versa.

Both switches as before stated, are constructed identically, as clearly shown in Fig. 4, so that the film F may be guided between the rollers 26 and 27. As the roller 27 is carried by the pivotally mounted frame 28 and is insulated at 29 from the frame of the projector, the arm 30 carrying the switch point 31 is moved so that the switch point 31 is placed in engagement with the switch point 32 of the stationary arm or contact 33. This arm or contact 33 is insulated from the frame 1 as at 34 and also from the member 28 as at 35, so that when the contacts 31 and 32 are disengaged, no current is flowing, and current only flows momentarily when the contacts are made due to the introduction of the projection 24 or 25 between its respective pair of rollers 26 and 27.

In order to provide a means whereby the sliding clutch members 12 of the respective clutches 10 and 11 may be operated automatically and in proper time, as is predetermined by the button or projection upon the film F, and thus automatically connects the selected record carrier with the projector mechanism, the end 40 of the lever 36 bears against the member 12, said lever being pivoted as shown at 37 so that the armature 38 will depend in attractive relation to the cores of the electromagnets 39—39' respectively, the same being constructed and arranged, as clearly shown in Fig. 1 of the drawings. Thus when either one of the respective electromagnets 39—39' is energized, the armature 38 will be attracted, the same assuming the position as shown at the record carrier A in Fig. 1, and thus causing the upper free end 40 of the lever 36 to engage the movable clutch member 12 to move the same into engagement with the clutch member 14. By this means, the shaft 9 is connected through the gear 20 to the operating gearing of the record carrier A, and such record carrier is thus rotated from the shaft 9 and consequently from the projector mechanism.

When the armature 38 is released, the same will assume the position as shown in connection with the record carrier B, Fig. 1, and thus permit the spring 17 of the clutch member 11 to free the clutch member 12 and consequently permit the free rotation of the shaft 9 within the sleeve 15 of the clutch member 14. Thus with the parts in the position as shown on Fig. 1, the record carrier A is being operated by the projector while the record carrier B is inert.

It is essential inasmuch as the electromagnet 39 or 39' is energized only for an instant, and as will presently appear, from the detailed description of the electrical diagram as illustrated in Fig. 3, that the armature 38 and its arm 37 will be locked in the position as shown in Fig. 1 for connection with the record carrier A. In order to accomplish this, the trigger 41, is projected through the aperture 42 of the armature lever 36, and has its projection 43 disposed to overlap the edge of the aperture as clearly shown in Fig. 1 and thus hold the armature toward the electromagnet 39 with the clutch actuating end 40 holding the clutch member 12 locked to the member 14. The trigger 41 is provided with the armature 44, by means of which the electromagnet 45 or 45', as will presently appear controls the release of its respective trigger 41—41ª.

In the present instance, the projection 24 of the film F, is disposed to operate the switch S, and simultaneously energize the electromagnets 39 and 45', while the projection 25 will actuate the switch S' and simultaneously energize the electromagnets 39' and 45, thus simultaneously connecting and disconnecting through the switch S, the record carriers A and B, respectively, and causing the reverse simultaneous action when the switch S is closed.

In order to clearly illustrate the electrical connection by means of which the above operation is carried out, reference is had to Fig. 3, the circuit controlled by the projection 24 and the switch S being as follows:

One point of the switch S, the conductor 46, the battery 47, the conductor 48, the electromagnet 39, the conductor 49, the electromagnet 45', and the conductors 50 and 51 to the remaining member of the switch S. Thus as before stated, the electromagnets 39 and 45' are energized simultaneously, and at the beginning of the connection of the sound record carrier A with the projector mechanism, the clutch member 11 having been disconnected so that the shaft 9 would not operate the record carrier B, the clutch member 10 will be operated, and thus the record carrier A will be connected to be operated from the shaft 9. When the armature 38 controlled by the electromagnet 39, is actuated, the latch or trigger 41 automatically locks the same in clutch holding position or in the position as shown in connection with the record carrier A in Fig. 1, and thus the clutch 10 is held in this position until automatically released by the energization of the circuit controlled by the switch S'. This circuit includes one member of the switch S', the conductor 52, the battery 53, the conductor 54, the electromagnet 45, the conductor 55, the electromagnet 39', the conductor 56, and the conductor 57, which is connected to the other point of the switch S'. Thus the electromagnets 45 and 39' are energized simultaneously, the electromagnet 45 elevating the latch or trigger 41 of the record carrier A and thus freeing the armature 38 to gravity and also the action of the spring 17 of the clutch 10 so that the clutch member 12 of the clutch is released from the member 14 thereof, while the electromagnet 39' attracts its armature 38 and consequently engages the clutch 11, the trigger 41ª at this time locking the clutch 11 to permit of the proper actuation of the record carrier B from the shaft 9, the record carrier A being disconnected from the shaft.

In the next succeeding actuation of the switch S, the trigger 41ª will be released through the energization of the electromagnet 45', and simultaneously with the energization of the electromagnet 39 and consequently the throwing of the clutch 10, this action disconnecting the clutch 11 and the record carrier B from the shaft 9 and again connecting the record carrier A through the clutch 10 to the shaft 9.

What is claimed is:

1. The combination with a motion picture projector and a plurality of sound reproducing mechanisms, a shaft being connected to and actuated by the projector mechanism, of means for alternately connecting and disconnecting the sound reproducing mechanisms to and from the shaft, the same including a plurality of clutches one to each sound reproducing mechanism, a film forming a part of the projector mechanism and having a plurality of switch actuators, switches respectively related to said clutches, a plurality of electro-magnets also related to said clutches, a source of electrical energy, a plurality of clutch throwing levers related respectively to said electro-magnets and clutches, a lock for each lever, an electromagnet for each lock, an independent electrical circuit including the source of electrical energy, a switch, and a lever controlling and a lock releasing electro-magnet whereby the closure of one switch will actuate one clutch and release the other.

2. The combination with a motion picture projector and two sound reproducing mechanisms, of a shaft connected to and operated by the projector and extending therefrom to all of the sound reproducing mechanisms, a plurality of clutches one to each sound reproducing mechanism mounted upon said shaft, one of the clutch members being a freely rotatable member and geared to its respective sound reproducing mechanism and the other clutch member being a spring released member keyed for sliding movement upon the shaft, an armature lever operably connected to each sliding clutch member, an electro-magnet for attracting said armature to move the sliding clutch member in opposition to its spring, an armature lock for locking the armature lever in such position, an electro-magnet for releasing said lock and consequently the sliding clutch member, and two electrical circuits including the first mentioned electro-magnet of one sound reproducing machine and the second electro-magnet of the other machine, whereby the clutches are alternately thrown in and out.

In testimony that I claim the foregoing as my own, I have hereto affixed my signature in the presence of two witnesses.

HARRISON W. ROGERS.

Witnesses:
 FRED J. WHELAN,
 ANNIE M. SOMMERS.